UNITED STATES PATENT OFFICE.

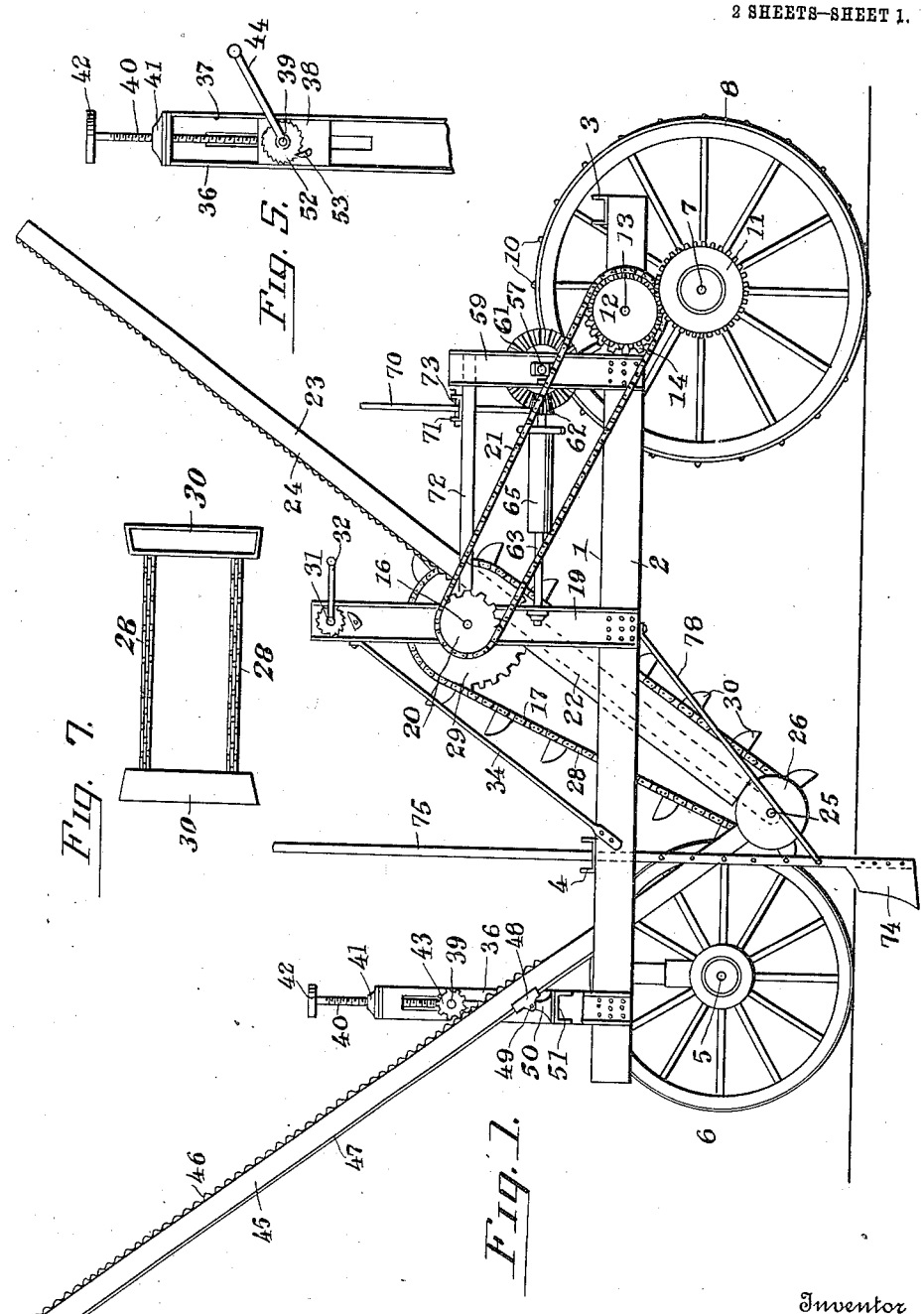

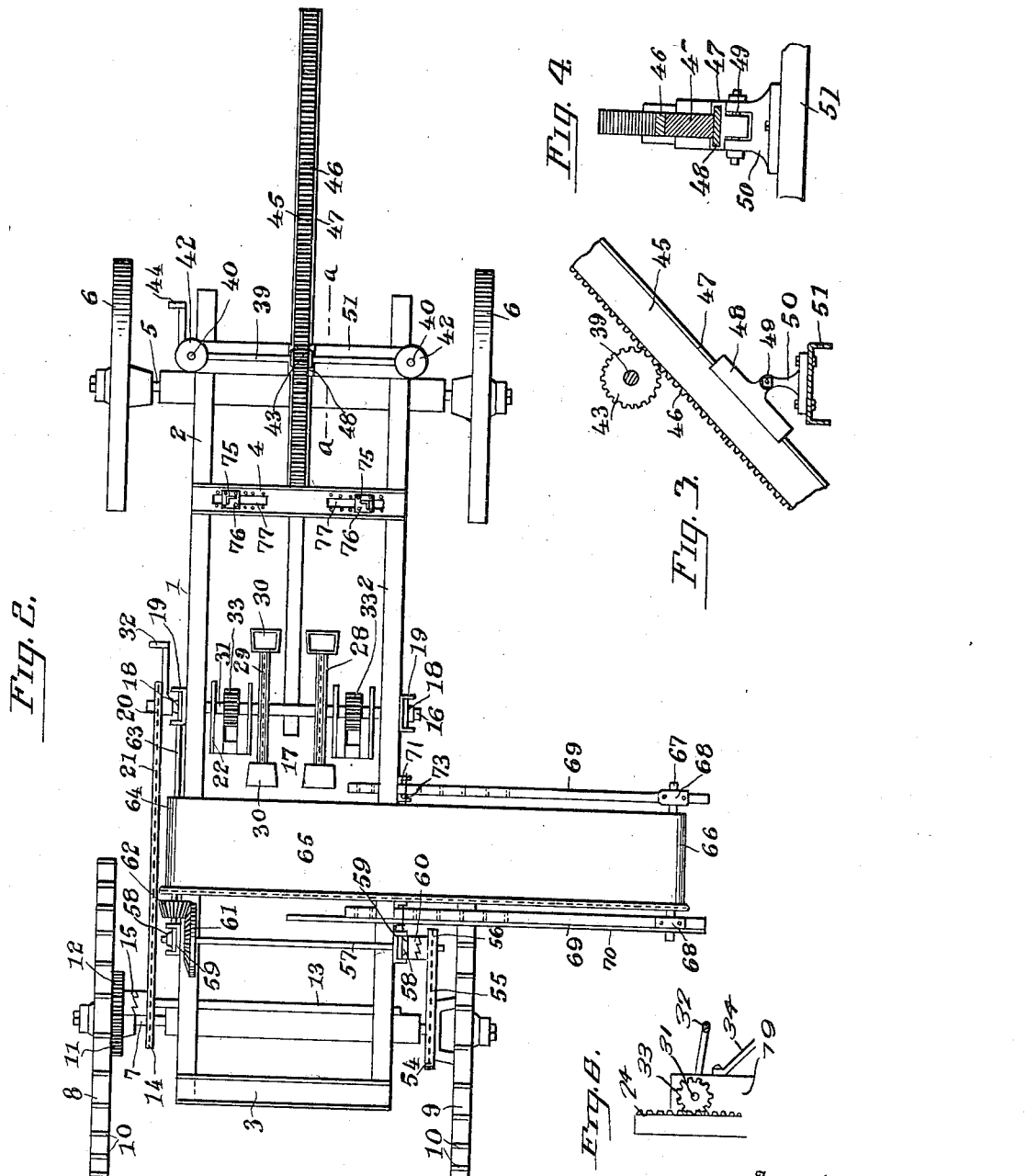

JOHN WHEELWRIGHT, OF OGDEN, UTAH.

TRENCHING AND GRADING MACHINE.

1,090,770.  Specification of Letters Patent.  Patented Mar. 17, 1914.

Application filed September 4, 1912. Serial No. 718,493.

*To all whom it may concern:*

Be it known that I, JOHN WHEELWRIGHT, a citizen of the United States, residing at Ogden, in the county of Weber and State of Utah, have invented new and useful Improvements in Trenching and Grading Machines, of which the following is a specification.

This invention is an improved grading and trenching machine for excavating trenches for water mains, sewers, drains, and the like, for digging canals and channels and for grading streets and railroads, the invention consisting in the construction, combination and arrangement of devices hereinafter described and claimed.

In the accompanying drawings:—

Figure 1 is a side elevation of a trencher and grader constructed in accordance with my invention, with the near wheels removed and the excavating and elevating mechanism raised. Fig. 2 is a plan of the same. Fig. 3 is a detail elevation, partly in section of the brace bar and coacting devices. Fig. 4 is a detail vertical sectional view of the same. Fig. 5 is a detail elevation of one of the standards and coacting devices for raising and lowering the brace rod. Fig. 6 is a detail elevation of one of the rack bars and coacting means for raising and lowering the elevator. Fig. 7 is a detail plan, showing a modified construction of the elevator chain.

The frame 1 of my improved trencher and grader is here shown as comprising a pair of side bars 2, a rear cross bar 3 and a cross bar 4 which connects the side bars at a point a suitable distance from the front ends thereof. The bars 2, 3 and 4 are preferably channel bars, as here shown. The frame is provided with a front axle 5 having supporting wheels 6 and with a rear axle 7 having independently revoluble supporting and driving wheels 8—9. The wheels 8—9 are provided with peripheral teeth 10 to cause them to rotate and to give the wheels the required tractive force.

On the inner side of the center of the wheel 8 is secured a spur wheel 11 which engages a similar wheel 12 on a shaft 13 which has its bearings in a side 2 of the frame 1 at a suitable distance from the rear end thereof. The said shaft 13 also has a sprocket wheel 14 and a clutch 15 whereby the sprocket wheel can be connected to or disconnected from the gear 12.

A shaft 16 which forms one element of an endless elevator 17 is mounted in bearings 18 which are secured in the channels of a pair of vertical standards 19 which rise from the side bars 2 at a point about midway between the front and rear ends of the frame. This shaft has a sprocket wheel 20 which is connected to the sprocket wheel 14 by an endless sprocket chain 21. A pair of guides 22 are pivotally mounted on the shaft 16 and a pair of longitudinally movable bars 23, which form the sides of the elevator 17 extend through and are movable longitudinally in the guides 22, the said bars 23 being provided on their front sides with rack bars 24. Hence the frame of the elevator 17 is pivotally mounted on the frame 2 of the machine for angular movement back and forth in a vertical plane and also for vertical adjustment so that the said elevator may have its lower end raised and lowered. A shaft 25 has its bearings at the lower ends of the bars 23 and is provided with disks 26 which are arranged at the outer sides of the said bars and which operate to throw the earth to the center between them. On the said shaft 25 a pair of sprocket wheels 27 are also secured. These sprocket wheels are connected by endless sprocket chains 28 to the sprocket wheels 29 which are secured on and revolve with the shaft 16. The said chain 28, which is the elevator chain, is composed of detachable links which admit of its being lengthened or shortened to compensate for vertical adjustment of the elevator, and certain of the detachable links of the elevator chain are provided at suitable intervals with elevator buckets 30.

An adjusting shaft 31 is mounted in bearings near the upper ends of the standards 19 and is provided at one end with a hand crank 32 whereby it may be rotated. The said shaft has also a pair of pinions 33 with which the racks 24 of the bars of the elevator frame may be engaged, when the elevator is nearly in a vertical position, and it will be understood that by first engaging the said rack bars with the said pinions and then turning the shaft 31, the bars 23 of the elevator may be raised or lowered so as to dispose the lower end of the elevator at any desired point and at any desired depth in the ground. It will be understood that the elevator will be driven in the direction indicated by the arrows in Fig. 1 so as to cause its front lead to move upwardly, the power from the wheel 8 being transmitted through the gears 11—12 and through the sprocket wheels 14—20 and endless chain 21 hereinbefore described to the shaft 16 which is the driving shaft of the elevator. Suitable braces 34 are provided for the standards 19.

A pair of vertical standards 36 rise from the side bars 2 of the frame 1 at a point near the front end of said frame and are provided with vertical guideways 37 in which operate bearings 38 for a shaft 39. These bearings are engaged by elevating screws 40 which operate in threaded openings in caps 41 at the upper ends of the guideways 37, the said elevating screws being provided at their upper ends with hand wheels 42, whereby they may be readily turned to raise or lower the shaft 39 and its bearings. This shaft is provided at its center with a pinion 43 and has a crank 44 at one end whereby the said shaft may be turned together with its pinion. A brace bar 45 has its lower end pivotally mounted on the center of the shaft 25 and is provided on its rear side with a rack bar 46 which is engaged by the pinion 43. On the front side of the brace bar 45 is a guide rail 47 the side edges of which project from opposite sides of said brace bar, the said guide rail traveling in a channeled guide block 48 which is pivotally mounted as at 49 on a block 50 which is secured on the center of a channeled cross bar 51 which extends across the frame 1 at a point in line with the standards 36. It will be understood that this brace bar 45 serves to hold the elevator in the required adjusted position and also materially assists in the adjustment of the elevator. The shaft 39 is also provided with a ratchet wheel 52 which is engaged by a pawl 53, the said pawl and ratchet wheel coacting to lock the shaft 39 against casual rotation.

On the inner side of the wheel 9, at the center thereof, is secured a sprocket wheel 54 which is connected by an endless sprocket chain 55 to a sprocket wheel 56 which is loose on a shaft 57, the said shaft being mounted in bearings 58 in the channels of a pair of vertical channeled standards 59 which are secured to the side bars 2 of the main frame 1 at a suitable distance from the rear end of said frame. On the said shaft 57 is a splined clutch element 60 which may be engaged with or disengaged from the sprocket wheel 56, to lock the latter to or release the same from the shaft 57. The said shaft also has a beveled gear wheel 61 which engages a smaller bevel gear 62 at the rear end of a shaft 63. The said shaft has its bearings in the standards 59—19 on one side of the frame. The said shaft also has a roller 64 which drives an endless conveyer apron 65, the said endless conveyer apron also engaging a roller 66 on a shaft 67 which has its bearings at the upper ends of a pair of vertical standards 68. These standards are secured at the outer ends of a pair of horizontally arranged bars 69 which project from one side of the main frame, the inner ends of the said bars being secured by suitable means to one of the side bars 2 of the main frame. The standards 68 are vertically adjustable at the outer ends of the bars 69 and said bars are also longitudinally adjustable, so that the endless conveyer may be caused to project from one side of the main frame to any desired extent and may be also arranged either in an inclined position or in a horizontal position, as may be required.

A brace rod 70 is connected at its outer end to one of the standards 68 of the endless conveyer and is also adjustably connected to a saddle or yoke 71 which is mounted on an angle iron brace 72 which connects one of the standards 19 to one of the standards 59. In practice, the brace rod 69 is provided with a series of adjusting openings, any one of which may be engaged by a lock pin 73 which is carried by the saddle 71.

It will be observed upon reference to Figs. 1 and 2 of the drawings, that the endless conveyer 65 which projects from one side of the frame of the machine is arranged just in rear of the endless elevator and at a point slightly lower than the upper end of said elevator so that the earth which is carried up by the elevator is dropped on the endless conveyer, the latter serving to discharge the earth at one side of the trench or other excavation made by the machine.

Side trimmers 74 are secured to the lower ends of vertically movable bars 75 which operate in guide plates 76. These bars 75 pass through and are laterally adjustable in slots 77 with which the cross bar 4 is provided and the said plates 76 are detachably secured on the said cross bar by bolts which engage adjusting openings with which the said cross bar is provided. Braces 78 have their front ends secured to the bar 75 and their rear upper ends secured to the side bars 2 of the main frame.

When the machine is used for excavating a ditch or trench, it is operated behind a "rooter" plow, the former breaking the ground in the bottom of the trench and the machine serving to raise the earth from the trench and discharge it to a point at one side thereof and parallel therewith as the machine progresses, as hereinbefore described. The elevator may be adjusted according to the depth of the trench from time to time by adding links to the elevator chains. The brace bar 45 in addition to serving to brace the elevator also assists in adjusting the same and serves to support the elevator when in raised position, as shown in Fig. 3.

When the machine is used for grading, the brace bar 45 may be dispensed with and the buckets 30 of the elevator chains may be of such length as to extend from chain to chain and connect both chains together.

The machine may be drawn by a team or may be propelled by any suitable motor, as will be understood.

While I have herein shown and described a preferred form of my invention, I would have it understood that changes may be made in the form, proportion and construction of the several parts without departing from the spirit of my invention and within the scope of the appended claim.

I claim:—

In a machine of the class described, a vehicle, standards thereon, a shaft having fixed bearings in said standards and also provided with a sprocket wheel, guides pivotally mounted on the said shaft and arranged to be swung forwardly and rearwardly, elevator bars movable longitudinally in said guides and provided with racks, a lower shaft carried by said bars and having a sprocket wheel, an endless elevator chain connecting the sprocket wheels, means to drive the endless elevator, an upper shaft also having fixed bearings in said standards and provided with pinions and also with means whereby said upper shaft may be rotated, a brace bar connected to the lower portion of the endless elevator and extending upwardly and forwardly therefrom, a support for the brace bar and means to raise and lower the brace bar to change the angle of the endless elevator as may be required and to also cause the racks of the elevator bar to be engaged with the pinions of the upper shaft when the elevator is in one position.

In testimony whereof I affix my signature in presence of two witnesses.

JOHN WHEELWRIGHT.

Witnesses:
 D. R. WHEELWRIGHT,
 WILLIAM J. SHURTLIFF.

Copies of this patent may be obtained for five cents each, by addressing the "Commissioner of Patents, Washington, D. C."